Inventor
Harold L. Blood
By Geo. H. Kennedy Jr.
Attorney

Patented Feb. 18, 1941

2,232,159

UNITED STATES PATENT OFFICE 2,232,159

SPINDLE MOUNTING AND BEARING THEREFOR

Harold L. Blood, Worcester, Mass., assignor to The Heald Machine Company, Worcester, Mass., a corporation of Massachusetts Application May 9, 1938, Serial No. 206,759

10 Claims. (Cl. 308—196)

The present invention relates to spindle mountings and to the bearings used therein; the invention involves certain novel constructions and arrangements of anti-friction bearings by which to obtain the vibrationless rotation of high-speed spindles or shafts.

The invention is applicable to a wide variety of uses; it is here shown, merely by way of example, in an environment which emphasizes its usefulness, namely as the journal mounting for a high speed tool spindle such as employed in the toolhead of a precision boring machine or an internal grinding machine, wherein practically vibrationless operation of the tool (boring tool or grinding wheel) is a paramount necessity.

Such high speed tools are usually required to operate with an appreciable overhang of their spindles beyond the toolhead bearings, and heretofore it has been impossible to use an overhang in excess of four times the tool spindle diameter, without setting up precision-destroying vibration of the tool. This condition has made it extremely difficult to obtain accurate boring or grinding of long holes of relatively small diameter.

My invention overcomes these and other difficulties, by its provision of a spindle mounting whose operation is so devoid of play or of other vibration-producing phenomena that the tool on the end of the spindle can have an overhang, beyond the toolhead bearings, of as much as ten times the spindle diameter without vibrating unduly in its high-speed operation.

Another object of my invention is to obtain this substantially vibrationless operation of a high-speed spindle without need for any preloading of the anti-friction bearings which provide its mounting, thus not only maintaining at all times the free-running character of said bearings, but also prolonging their useful life, and eliminating the danger of any break-down due to over-loading.

In said anti-friction bearings of my invention, the construction of the raceways is such that each of the balls or other interposed members maintains contact at three points with said raceways, and this holds true whether the load on the bearing be all radial, or all axial, or a combined radial and thrust load.

The above and other and further objects and advantages of the invention will hereinafter more fully appear from the following detailed description taken in connection with the accompanying drawings in which—

Fig. 4 is a fragmentary view illustrating the approximate permissible limit of overhang for a grinding wheel spindle, when a spindle mounting of conventional type is employed.

Fig. 5 is a view similar to Fig. 4, showing the extent to which the overhang may be increased, without undue vibration in the high speed grinding wheel, when the spindle is mounted in bearings of the construction and arrangement contemplated by my invention.

Like reference characters refer to like parts in the different figures.

Figure 1:
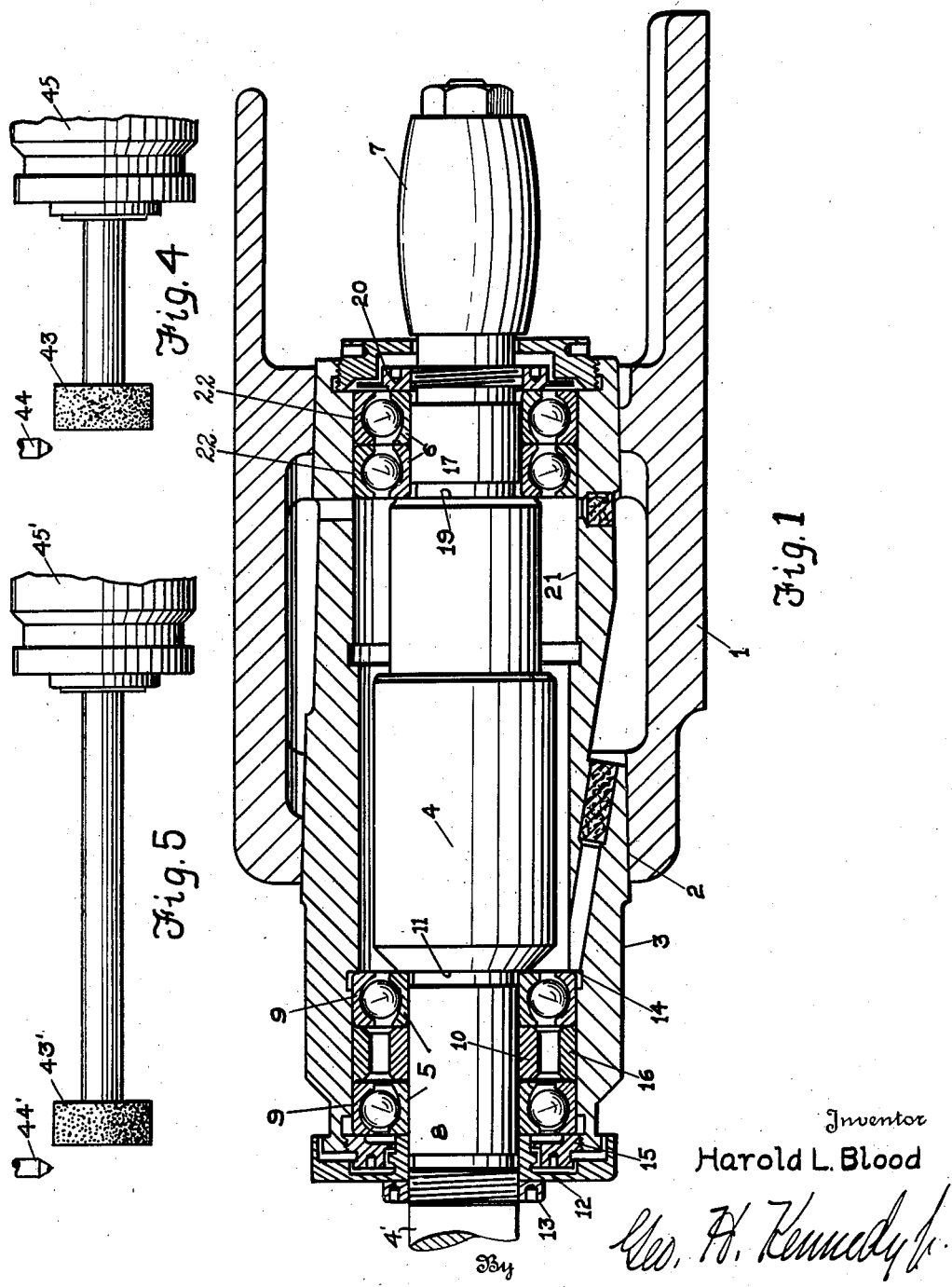
Fig. 1 is a sectional view of a toolhead, having its spindle mounted in ball bearings of the construction and arrangement contemplated by my invention.

In Fig. 1, I have shown my invention applied to a toolhead of the type which is commonly used in a boring machine or an internal grinding machine. Said toolhead, as shown, comprises a base or shell I having a tapered bore 2 wherein is received and held a housing 3, the latter containing and supporting my improved anti-friction bearings which, in this particular application of my invention, are arranged to afford rotative support for a tool-carrying spindle 4. Said spindle is adapted to be rotated at high speed by any suitable means; for this purpose, the spindle may, as herein shown, have its inner end extended beyond the housing 3 to receive a pulley 7, adapted to be engaged by a driving belt, not shown. At its other projecting end, said spindle 4 carries the tool,—for example, a grinding wheel or a boring tool,—said tool, not shown, being secured either to an integral extension 4' of said spindle 4, or if desired, being provided on a separate spindle which is connected in any suitable way to the outer end of spindle 4.

For rotatably mounting the spindle 4 in the housing 3, the ball or anti-friction bearings of my invention may be provided in a plurality of appropriately spaced pairs, there being two such pairs in the arrangement shown by Fig. 1, designated respectively 5, 5 and 6, 6. The ball bearings 5, 5 have their inner race rings mounted, in the usual manner, on a reduced section 8 of the spindle, and the outer race rings of said bearings are received, in the usual manner, in a bore 9 of housing 3. Similarly, the inner race rings of the other pair of bearings 6, 6 are mounted on a reduced section 17 of the spindle, the outer race rings of said bearings 6, 6 being received in a bore 21 at the inner end of housing 3. All of the ball bearings 5, 5 and 6, 6 of Fig. 1 are of the special construction contemplated by my invention; this bearing construction is illustrated by Figs. 2, 3 and 6 hereof, and it will be understood that the following description of such bearing construction applies to each of the several ball bearings 5, 5 and 6, 6 which are provided in the housing 3 for the rotative mounting of the tool spindle 4.

Figure 2:
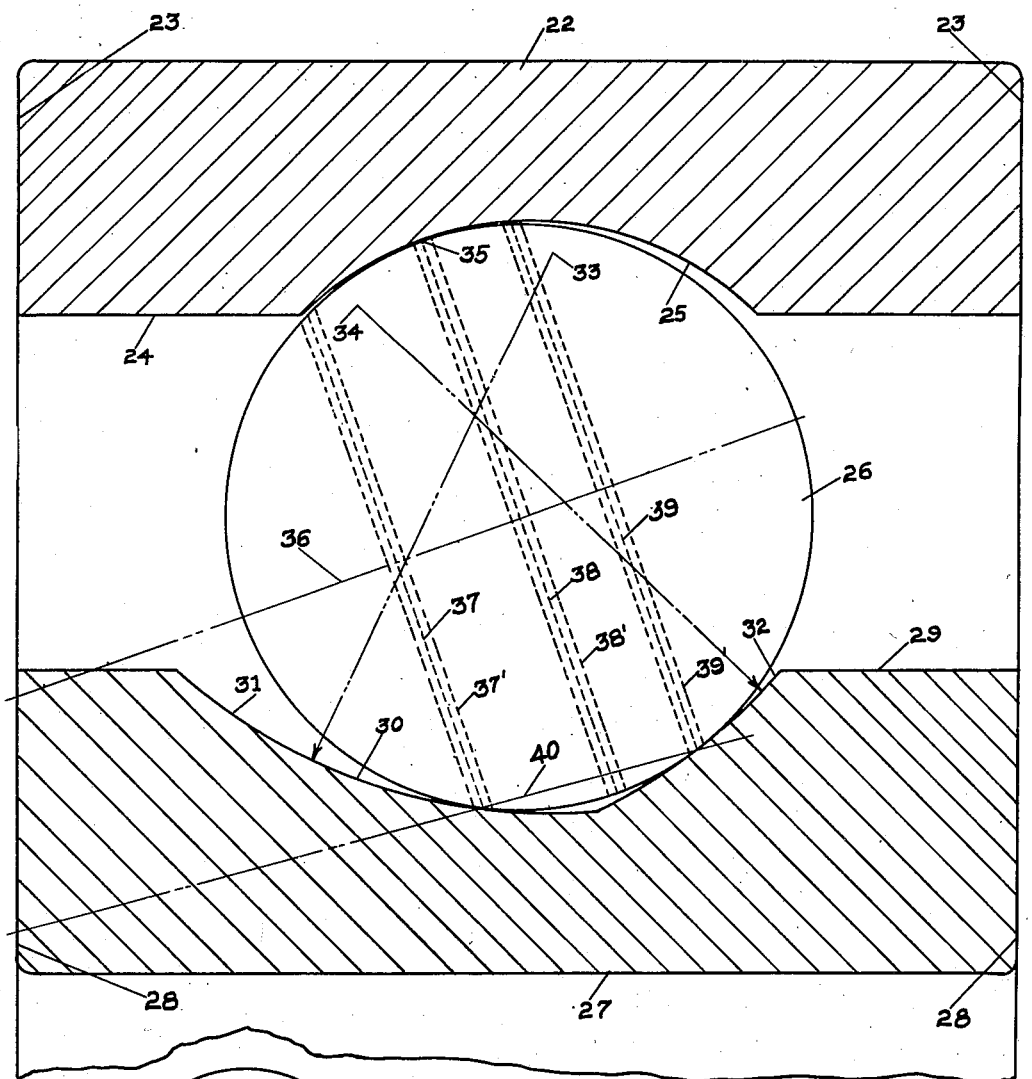
Fig. 2 is a large scale sectional view of one of said ball bearings embodying my invention, as used in the toolhead of Fig. 1.
Figure 3:
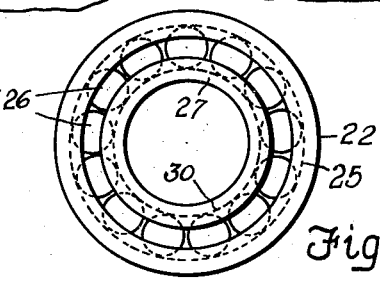
Fig. 3 is a small scale side elevation of the bearing of Fig. 2.
Figure 6:
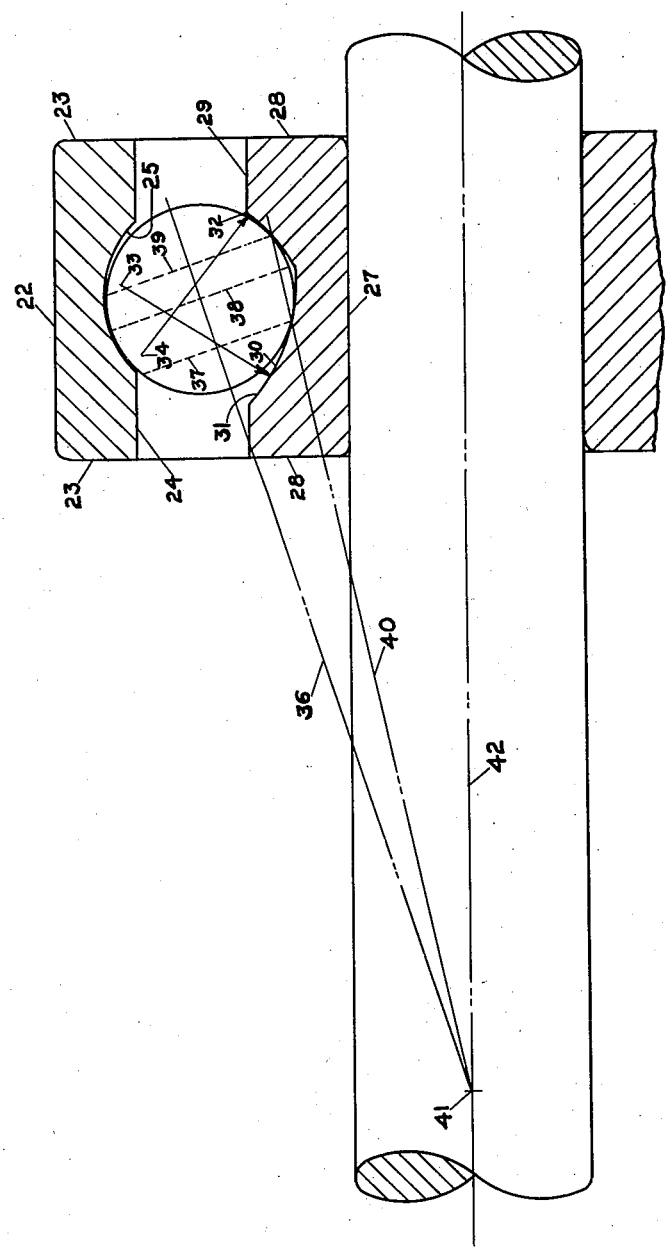
Fig. 6 is a diagrammatic view, illustrating a certain relationship between the bearing of my invention and the axis of the therein-journalled shaft or spindle.

Referring now to Figs. 2, 3 and 6, the anti-friction bearing of my invention provides an outer race ring 22 and an inner race ring 27, said rings having formed in their opposed surfaces 24 and 29 the respective raceway grooves 25 and 30, for the reception of a plurality of balls 26, 26, the latter being preferably provided with the usual cage devices, not shown, for holding them in spaced relation. The raceway 25 of the outer ring 22 is of substantially circular cross section, and of a radius only slightly in excess of the radius of a ball 26.

The raceway 30 of the inner ring 27 is ogival in cross section; that is, its curvature or outline in the cross-sectional plane, Fig. 2, is made up of two intersecting arcs 31 and 32 each of a radius somewhat less than the ball diameter, the arc 31 being struck from a center 33, and the arc 32 being struck from a center 34; the center 34 being preferably appreciably nearer, radially, to the axis 42 of the bearing than the center 33. In consequence of this relationship of the centers 33 and 34, the slope of arc 32, relative to the bearing axis, is much steeper than that of arc 31, this giving the bearing, when operating as hereinafter described with three-point contact of each ball with the raceway surfaces 25, 31 and 32, the desired thrust-resisting capacity.

The ogival inner raceway of my bearing thus differs materially from the ogival inner raceway of the ball bearing shown and described in Lippert-Bruenauer Patent No. 1,310,423, of July 22, 1919; furthermore, in contradistinction to the ball bearings having ogival inner raceways, whose method of manufacture is described in Alden Patent No. 1,708,491, of April 9, 1929, my bearing's outer race ring, instead of having a conical ball-contacting surface as in said Alden process bearings, is formed with the concave arcuate raceway 25 which substantially conforms to and overlies and confines an appreciable portion of the surface of each ball 26.

These structural distinctions from the prior ogival raceway bearings of said Lippert-Bruenauer and Alden patents are of the utmost importance, in that they permit my bearing to operate, as hereinafter described, in the absence of any pre-loading, while still maintaining the desired three-point contact of the balls with the raceway surfaces under any and all load conditions. This is not the case with the bearing of Lippert-Bruenauer, wherein the balls have only a two-point contact when the bearing is operating either under thrust loads, or under combined thrust and radial loads; as regards the bearings of said Alden patent, since they are produced and finished under definitely pre-loaded conditions, it follows that they can operate with the desired three-point contact of their balls only when they are put under a pre-load of substantially the same degree as that which was effective during the finishing operation thereon.

In my improved bearing on the other hand, no pre-loading is required to establish and maintain the three-point contact of the balls 26 with the respective raceway surfaces 25, 31 and 32, and such three-point contact, in the absence of pre-loading, is always obtained in the operation of the bearing, regardless of whether the working load thereon be all radial, or all axial, or a combined radial and axial working load. The absence of any pre-load on the bearings of my invention, when the latter are operatively associated with a rotating element, is illustrated in Fig. 1. That is to say, having regard to the fact that in the unloaded condition of my bearing shown by Fig. 2, the end surfaces 23 and 28 of the inner and outer race rings are in exact alinement, it will be noted that the left hand pair 5, 5 of my improved bearings are arranged in Fig. 1 to preserve and maintain these non-load positions of their race rings. To this end, the inner race rings, here shown as separated by a spacer sleeve 10, are pressed against a shoulder 11 of spindle 4 by a plate or disk 12 which encircles the reduced portion 8 of the spindle, being held in position by a ring or nut 13 which is turnable on a threaded portion of the spindle extension; exact alinement of the end surfaces 28, 28 of these inner raceways with the end surfaces 23, 23 of the associated outer raceways is obtained by pressing said outer raceways, (here shown as separated by a spacer sleeve 16 of the same length as sleeve 10), against a shoulder 14 of housing 3, by means of a threaded ring 15 which is turnable in a threaded portion at the end of housing 3. In similar fashion, the inner race rings of my bearings 6, 6 at the right hand end of Fig. 1 are held against a shoulder 19 of spindle 4, by means of a ring 20 in threaded engagement with the reduced portion 17 of said spindle, but the outer race rings 22, 22 of these two bearings are purposely left unrestrained against relative axial displacement in the bore 21, to permit my spindle mounting to compensate for any inequalities of expansion or contraction between the spindle 4 and the housing 3; this arrangement allows my bearings 6, 6 to remain unloaded under all conditions encountered in the operation of the tool-head.

The arcuate raceway 25 in the outer race ring has its center of curvature slightly offset, laterally, from the plane containing the centers of the balls 26 when the latter, as shown in Fig. 2, are in contact with both the surfaces 31 and 32 so that the point of contact 35 of any ball 26 with the raceway 25 will be at a point offset from the deepest portion of the raceway, the arrangement being such that its point's theoretical line of contact with a ball will lie between the two theoretical lines of ball contact with the surfaces 31 and 32 of the inner raceway. It may be noted that the proportions of the surfaces making up the raceways are such that, theoretically at least, a ball will roll on an axis represented by the line 36. That this pure rolling action of the balls in my improved bearing is approximately attained in actual operation, has been demonstrated by running such a bearing for a period under a light load; under such conditions the balls 26 show three distinct lines of wear, 37, 38 and 39. The line of wear 38 obviously results from contact with the outer raceway, and the lines of wear 37 and 39 result from contact with the surfaces 31 and 32 respectively.

When my bearing is in actual use, under a normal load, the wear on the balls tends to be distributed over bands represented by the dotted lines 37', 38' and 39' since under a sufficient external load the balls in effect have area contact rather than point contact with the raceways. When the bearings of my invention are operated without any appreciable load, the precise lines of wear described above do not always appear, and there may, in fact, be uniform wear on the entire ball. This results in a longer life for the bearing.

Preferably, for the attainment of the above described pure rolling action of the balls, the several parts of my improved bearing are so designed and proportioned that the axis of rotation of any ball, represented by the line 36, intersects the axis 42 of the bearing at substantially the same point as a line 40, Fig. 6, passing through the two points at which the ball contacts the ogival inner raceway. The line 36 is at right angles to the lines of wear 37, 38 and 39.

Referring again to Fig. 1, it will be apparent that since the outer race rings 22 of bearings 6, 6 are free to shift axially within the housing, there is at no time any axial pre-load on these bearing structures. Also, there is no pre-load of the bearings 5, 5, because these bearings are so designed that by maintaining in alinement the outer end surfaces of their inner and outer race rings the absence of pre-load is assured. In spite of this absence of pre-load the spindle is found to rotate with no appreciable vibration even when its overhanging end, carrying the tool, is much longer in proportion to the diameter than has ever heretofore been deemed possible, in precision grinding or boring operations.

In referring to bearings of this character, the end of the bearing adjacent to the steeper curved surface 32, of the inner raceway, is referred to as the front of the bearing, and the opposite side or end of the bearing is referred to as the back of the bearing. With reference to Fig. 1, it will be noted that the bearings 5 at the end of the spindle adjacent to the tool are shown as mounted back to back, although from experiment it has been found that these bearings may be as readily mounted front to front without affecting the vibrationless rotation of the spindle. The bearings 6 at the rear of the housing, or adjacent to the pulley 7, are the bearings which have their outer race rings mounted for axial sliding movement and these bearings must be mounted back to back, as shown, in order that the outer race rings may have their opposite end surfaces in the same plane as the corresponding end surfaces of the inner rings at all times, since, as will be apparent from Fig. 2, the outer ring is movable slightly to the left, relative to the inner ring, from the position shown, although the outer ring is not movable to the right relative to the inner ring, beyond the position shown, without applying a pre-load to the bearing. It will be apparent that all of the bearings are so mounted that the inner and outer race rings of each bearing are always in the same predetermined axial relation to each other at all times.

Fig. 4 shows the approximate permissible overhang which a grinding wheel 43 may have, beyond its spindle-supporting head 45, when the latter is equipped with conventional bearings; if with such spindle mountings this overhang, shown approximately as four times the spindle diameter, is made any greater, then not only will the wheel's vibration have a serious effect on the precision of the grinding operation, but it will also prevent the wheel from obtaining a satisfactorily trued cutting surface when subjected, in the usual manner, to the action of a dressing device, such as indicated at 44.

However, with the toolhead or spindle mounting having bearings constructed and arranged in accordance with my invention, a much greater overhang of the grinding wheel, beyond said toolhead, is permitted; in Fig. 5, wherein such a toolhead is indicated at 45', the grinding wheel 43' is shown with an overhang of approximately ten times the diameter of its spindle. Even with this extremely long overhang, the grinding wheel 43' will be so free of vibration that it can be properly dressed by a truing tool 44' and its grinding operation will produce the desired smooth surface and precision size, which, up to the present time, has been impossible with an overhang greater than that of Fig. 4. Not only is it possible with my invention to greatly increase the overhang of the tool spindle and still obtain satisfactory results, but the toolhead itself has been given a longer life by reason of the absence of any pre-load on the bearings.

I claim:

1. In a toolhead, a housing, a spindle, and a pair of antifriction bearings in which said spindle is journalled, each bearing comprising an inner and an outer race ring and an interposed series of balls having their centers in a common plane, the inner ring having an ogival raceway made up of a relatively steep surface and a relatively flat surface providing two points of contact with each ball on opposite sides of and at unequal distances from said plane, and the outer ring having an arcuate raceway, each bearing being mounted to prevent relative axial movement between inner and outer rings, and with the center of the arcuate raceway offset from the centers of the balls when they are in contact with both surfaces of the ogival raceway, the bearings being mounted with corresponding surfaces of the ogival raceways adjacent each other.

2. An angular contact ball bearing comprising inner and outer race rings, the inner ring having an ogival raceway, one of the arcuate surfaces of which is substantially steeper than the other, and the outer ring having an arcuate raceway and an interposed series of balls having their centers in a common plane, each ball making contact with said ogival raceway at two points on opposite sides of and at unequal distances from said plane.

3. An angular contact ball bearing comprising inner and outer race rings, one of said rings having an ogival raceway and the other ring having an arcuate raceway, and an interposed series of balls having their centers in a common plane, said ogival raceway being made up of a relatively steep and a relatively flat arcuate surface, each of said surfaces making a point of contact with each ball, said points of contact being on opposite sides of and at unequal distances from said plane.

4. A ball bearing comprising inner and outer race rings and a set of interposed balls having their centers in a common plane, the inner ring having an ogival raceway making two-point contact with each ball under all conditions of radial and axial external load, said points of contact being on opposite sides of said plane, and the outer ring having a concave arcuate raceway whose radius is slightly greater than the ball radius and whose center of curvature is offset laterally from the plane containing the centers of the balls when the latter are in two-point contact with said inner raceway.

5. In a spindle mounting of the class described, a housing, a spindle therein, and a plurality of anti-friction bearings by which said spindle is journalled in said housing, each of said bearings comprising inner and outer race rings, with interposed rolling members having their centers in a common plane, each inner ring having an ogival raceway making two-point contact with each rolling member under all varying conditions of radial and thrust load on said spindle, said contact points being on opposite sides of said plane, and each outer ring having a concave arcuate raceway making single-point contact with each rolling member, said arcuate raceway being on a radius slightly greater than that of the rolling members, and having its center of curvature offset axially from the plane containing the centers of said rolling members when the latter make two-point contact with said ogival raceway.

6. In a ball bearing, an inner race ring and an outer race ring and an interposed series of balls having their centers in a common plane, the inner race ring being formed with a concave raceway providing two points of contact with each ball on opposite sides of and at unequal distances from said plane, and the outer race ring being formed with a concave raceway making single point contact with each ball, said last-named raceway being a groove of arcuate section extending transversely in one direction beyond said point of contact and in the other direction beyond said plane.

7. In a ball bearing, an inner race ring and an outer race ring and an interposed series of balls having their centers in a common plane, the inner race ring being formed with a concave raceway making under all conditions of load on the bearing two points of contact with each ball on opposite sides of said plane, and the outer race ring being formed with a concave raceway groove of arcuate section adapted, when the load on the bearing has any axial component, to contact each ball at a single point which is out of line, diametrically, with both of the points of contact of said inner raceway.

8. In a spindle mounting of the class described, a pair of ball bearings, each providing an inner race ring and an outer race ring and an interposed series of balls, one of the race rings being formed with a concave raceway providing two points of contact with each ball on opposite sides of and at unequal distances from the common plane of the ball centers, and the other race ring being formed with a groove of arcuate section for single point contact with each ball, said bearings being arranged with the corresponding surfaces of their first-mentioned raceways in opposed relation.

9. In a spindle mounting of the class described, a pair of ball bearings, each providing an inner race ring and an outer race ring and an interposed series of balls, one of the race rings being formed with a concave raceway providing two points of contact with each ball on opposite sides of and at unequal distances from the common plane of the ball centers, and the other race ring being formed with a groove of arcuate section for single point contact with each ball, said bearings being arranged with the corresponding surfaces of their first-mentioned raceways in opposed relation and means for preventing appreciable relative axial displacement between the respective race rings of each bearing, whereby each ball, by the contact therewith of its arcuate raceway is maintained in two-point contact with its other raceway.

10. In a ball bearing, an inner race ring and an outer race ring and an interposed series of balls having their centers in a common plane, one race ring being formed with a concave raceway providing two points of contact with each ball on opposite sides of and at unequal distances from said plane, and the other race ring being formed with a concave raceway making single point contact with each ball, said last-named raceway being a groove of arcuate section extending transversely in one direction beyond said point of contact and in the other direction beyond said plane.

HAROLD L. BLOOD.